(12) United States Patent
Hoffmann

(10) Patent No.: US 8,855,370 B2
(45) Date of Patent: Oct. 7, 2014

(54) METHOD AND DEVICE FOR DETERMINING A CALIBRATION PARAMETER OF A STEREO CAMERA

(71) Applicant: Hella KGaA Hueck & Co., Lippstadt (DE)

(72) Inventor: Ingo Hoffmann, Berlin (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 13/627,050

(22) Filed: Sep. 26, 2012

(65) Prior Publication Data
US 2013/0021451 A1 Jan. 24, 2013

Related U.S. Application Data

(62) Division of application No. 11/793,740, filed as application No. PCT/EP2005/057144 on Dec. 23, 2005, now Pat. No. 8,300,886.

(30) Foreign Application Priority Data

Dec. 23, 2004 (DE) .......................... 10 2004 062 275

(51) Int. Cl.
*G06K 9/00* (2006.01)
*H04N 13/02* (2006.01)
*G06T 7/00* (2006.01)

(52) U.S. Cl.
CPC ....... *H04N 13/0246* (2013.01); *H04N 13/0239* (2013.01); *G06T 7/002* (2013.01); *G06T 2207/10012* (2013.01)
USPC ......................................................... 382/103

(58) Field of Classification Search
None
See application file for complete search history.

(56) References Cited

U.S. PATENT DOCUMENTS

| 5,608,528 A | 3/1997 | Ogawa |
| 5,727,080 A | 3/1998 | Cox et al. |
| 6,690,011 B2 | 2/2004 | Watanabe et al. |

(Continued)

FOREIGN PATENT DOCUMENTS

| DE | 10063756 A1 | 12/2000 |
| DE | 10154861 A1 | 11/2001 |

(Continued)

OTHER PUBLICATIONS

Japanese Office Action for JP Patent Application No. 2007-547542 Dated Oct. 5, 2010.

(Continued)

*Primary Examiner* — Tom Y Lu
(74) *Attorney, Agent, or Firm* — MKG, LLC

(57) ABSTRACT

The invention relates to a method and device for determining object property of an object with the aid of images that have been recorded with the aid of a camera. Further, the invention relates to a method for determining a calibration parameter for a stereo camera. For determining the object property of an object, the object is defined in a first image recorded with the aid of the camera. Further, the brightness of a defined object is determined. Each time after a preset time interval, a further image is recorded with the aid of the camera. The object is defined in each of the further images and each time, the brightness of the defined object of each image is determined. Dependent on the brightness curve, an object property is assigned to the object.

22 Claims, 13 Drawing Sheets

(56) References Cited

U.S. PATENT DOCUMENTS

| | | | |
|---|---|---|---|
| 7,499,638 B2 * | 3/2009 | Arai et al. | 396/108 |
| 2005/0237385 A1 | 10/2005 | Kosaka et al. | |
| 2008/0291282 A1 * | 11/2008 | Fitzgibbon et al. | 348/187 |

FOREIGN PATENT DOCUMENTS

| DE | 10229336 A1 | | 6/2002 | |
|---|---|---|---|---|
| EP | 0626654 | | 5/1994 | |
| EP | 1376051 | | 1/2004 | |
| FR | 2846448 A | | 10/2004 | |
| GB | 2396005 | * | 6/2004 | G01S 7/497 |
| JP | 07225413 A | | 8/1995 | |
| JP | 08122890 A | | 5/1996 | |
| JP | 10-341458 A | | 12/1998 | |
| JP | 2000156852 A | | 6/2000 | |
| JP | 2001-169310 A | | 6/2001 | |
| JP | 2004-125795 A | | 4/2004 | |
| JP | 2008122890 | | 5/2008 | |
| JP | 2010185685 | | 7/2010 | |
| WO | 2004106856 A1 | | 12/2004 | |

OTHER PUBLICATIONS

English Translation of Notice of Reasons for Rejection issued in corresponding Japanese Patent Application No. 2011-205065 mailed on Jun. 18, 2013.

* cited by examiner

Stereo camera coordinate system used

METHOD AND DEVICE FOR DETERMINING A CALIBRATION PARAMETER OF A STEREO CAMERA

CROSS-REFERENCE TO RELATED APPLICATIONS

This application is a divisional patent application of, and claims priority to, U.S. patent application Ser. No. 11/793,740 titled "Method and Device for Determining a Calibrating Parameter of a Stereo Camera," filed on Nov. 21, 2007, which is a national stage entry of PCT Application No. PCT/EP2005/057144 titled "Method and Device for Determining a Calibrating Parameter of a Stereo Camera," filed on Dec. 23, 2005. The foregoing applications are incorporated by reference in their entireties herein.

FIELD OF THE INVENTION

The invention relates to a method and a device for determining a calibration parameter of a stereo camera. With the aid of the stereo camera, object images of an object are each time recorded at least two times one after the other at an interval, and each time the distance between the stereo camera and the object is determined.

Further, the invention relates to a method and a device for determining an object property of an object with the aid of images which have been recorded with the aid of a camera as well as to a computer software and a data carrier carrying this computer software.

BACKGROUND OF THE INVENTION

Known stereo camera systems comprise two single-image cameras, each of which preferably comprise a CCD sensor and a fixed focal length lens system or, alternatively, a CMOS image sensor and such a lens system. Preferably, the single-image cameras simultaneously take one image each. These images are referred to as an image pair. With the aid of the images taken, a direct distance measurement of objects visible in both images can be made. For determining the distance, it is important to precisely know, in addition to the camera parameters, also the orientation of the optical axes of the single-image cameras with respect to one another. A stable construction can for example be chosen, by means of which the two cameras only slightly change their position to one another under intended operating conditions. As a result thereof, stability over an extended period of time is achieved for a calibrated system. In addition to the relatively complex structure, which also occupies a considerable amount of space, considerable inaccuracy of the measurement result can occur during distance measurement as a result of changes in position of the cameras with respect to one another despite the stable construction. This requires a range limit for the distance measurement in order to obtain measurement results within a reasonable tolerance. Only by means of a stable construction and a limitation of the measurement accuracy and the range, can distance measurements usefully be made over a longer period of time with such a stereo camera system without complex calibration services having to be performed in the meantime.

If, however, a higher accuracy and/or the determination of greater distances is required, a readjustment of the stereo camera system or a re-calibration has to be carried out. It is possible to achieve a higher measurement accuracy by way of a perfect mechanical orientation of the optical axes of the camera system, or to determine the actual positions of the optical axes for example by the determination of error angles and to take these actual positions into account as calibration parameters in the evaluation of the recorded images. These positions can in particular be taken into account in the evaluation algorithm for determining the distance of an object. One criterion for the practicability of a stereo camera system is that during normal operation no servicing is required for adjustment and calibration and that disturbances are recognized and removed as automatically as possible.

The calibration of known stereo camera systems having the stable mechanical construction described is carried out with the aid of special master images, of which one image each is taken with the aid of the single-image cameras. In order to ensure a high measurement accuracy of the stereo camera system during distance measurement, this calibration has to be repeated at time intervals which are dependent on the environmental conditions. During the calibration process, in the images recorded by the single-image cameras of the stereo camera system prominent corresponding two-dimensional object images are measured. Usually, from at least nine such corresponding object images a so called fundamental matrix is determined using a reliable method. This fundamental matrix contains both a rotation matrix of the two cameras with respect to one another and their distance vector. However, given this method the position determination of the image contents with the aid of the cameras is only possible with an accuracy that depends on the camera resolution. Thus, an ultra-precise calibration of the camera system is not possible with the aid of such a known method.

Further, if there is a relative movement between the stereo camera system and an observed object, another known method for self-calibration of the stereo camera system can be used. With the aid of an image sequence recorded by one of the cameras of the stereo camera system, the relationship of the movements of the object traced over several images with respect to its total distance can be derived, i.e. can be calculated. As a result of the measurement of the same object in the image pairs of the two cameras of the stereo camera system, a faulty distance curve is determined. Subsequently, the two measured values are compared to one another, as a result whereof the error angles of the calibration can be estimated. In this known method, too, the accuracy with which the error angles can be determined is dependent on the accuracy of the position determination of the objects with the aid of the object images recorded by the cameras.

SUMMARY OF THE INVENTION

The possible error angles of a stereo camera system comprising two single-image cameras will be explained in more detail in the following description of figures in connection with FIGS. 2 to 5. For simplification, a camera coordinate system according to FIG. 2 is defined in this patent application for describing the location and position of the single-image cameras, which camera coordinate system can have an arbitrary position with respect to other coordinate systems. However, each location and each position of each single-image camera can also be indicated with respect to another coordinate system, for example the world coordinate system of a defined image coordinate system. A position in the camera coordinate system can easily be converted into a position in the world coordinate system or, respectively, into a position in the image coordinate system, if the positions of the two coordinate systems with respect to one another are known.

In the following embodiments, the coordinate origin of the camera coordinate system is defined in the point of intersection of the optical axis of the first single-image camera with the image plane of this first single-image camera. The optical axis of the first single-image camera is defined as Z-axis of the camera coordinate system. The vector from the coordinate origin to the point of intersection of the optical axis of the second single-image camera with the image plane of this second single-image camera and the Z-axis establish a plane in which the X-axis, which is arranged orthogonally to the Z-axis, extends. The Y-axis extends orthogonally to the Z-axis and orthogonally to the X-axis. The distance vector between the points of intersection of the optical axes of each of the cameras with their image planes is referred to as a base width, the single-image cameras being arranged offset to one another by a value V=(base width, 0, 0), when the points of intersection of the optical axes of both cameras with their image planes lie on the X-axis.

Such a camera coordinate system has the advantage that independent of the position of the single-image camera with respect to the surrounding, the offset of the two single-image cameras by the base width is more or less always directed in the direction of the X-axis. When the single-image cameras are arranged directly on top of one another in the world coordinate system, then the X-axis of the camera coordinate system runs substantially vertically in the world coordinate system and the Y-axis and the Z-axis of the camera coordinate system run substantially horizontally in the world coordinate system. Given an exact horizontal orientation of the X-axis of the camera coordinate system in the world coordinate system, the Y-axis of the camera coordinate system runs vertically and the Z-axis likewise runs horizontally. In particular, given an installation of the stereo camera system in a vehicle moving in the space of the world coordinate system, such a camera coordinate system has the advantage that the positions of the coordinate systems with respect to one another do not have to be determined continuously and do not directly have to be taken into account in the evaluation and the analysis of the recorded images, for example for determining the distance of an object recorded.

According to the definition of angles in this patent application, the angle by which a single-image camera is rotated about the X-axis is referred to as the pitch angle. The angle by which a single-image camera is rotated about the Z-axis is referred to as the roll angle. The angle by which a single-image camera is rotated about the Y-axis is referred to as the yaw angle.

The terms roll angle, pitch angle and yaw angle substantially correspond to the angles used in the orientation of an airplane which have the same designations.

The pitch angle and the roll angle can be determined by an analysis of an image pair. At least two image correspondences, i.e. two prominent correspondences, are determined in the images simultaneously recorded with the aid of the two cameras. On the basis of the position of these image correspondences in the images recorded with the aid of the cameras, the deviations from a preset pitch angle and a preset roll angle are determined, the preset angle values being corrected with the aid of the determined deviation for image correction and/or for image analysis. Thus, the deviations indicate the pitch angle error and the roll angle error. However, at present, no method and no device are known with which a calibration parameter of a stereo camera for distance measurement, in particular a yaw angle error or a yaw angle can easily be determined.

It is the object of the invention to specify a method and a device, in which a calibration parameter for a stereo camera can reliably be determined in a simple way. Further, a method and a device are specified by means of which at least one object property of an object can easily be determined with the aid of images.

According to a first aspect of the invention, this object is solved by a method as indicated in claim 1 for determining an object property of an object with the aid of images recorded by a camera. Advantageous developments of the invention are given in the dependent claims.

By means of such an inventive method for determining an object property, the brightness curve of an object image recorded with the aid of the camera is analysed. Preferably, at least one property of the brightness curve is analysed and evaluated.

With the aid of the inventive method, it can, for example, be determined whether the object is a light source operated at an alternating voltage, which then can be assumed as being stationary. As a result thereof, the actual relative speed between the stereo camera and the object can be determined by determining the absolute speed of the stereo camera, for example, in the world coordinate system.

A second aspect of the invention relates to a device for determining an object property of an object with the aid of images which have been recorded with the aid of a camera. The device comprises a camera which, at least at a preset interval, records images of at least one object. Further, the device comprises means which define at least one object in a first image recorded with the aid of the camera and which determine the brightness of the object defined. Further, the means define the object in each of the further images recorded with the aid of the camera at the preset interval, and each time determine the brightness of the object defined. Further, the means assign an object property to the object dependent on the brightness curve.

This inventive device determines at least one object property of the object in an easy way. This object property can then easily be used for the further processing of the image data recorded with the aid of the camera. For example, the object property can be used for performing a calibration operation of a stereo camera system to which the camera of the device belongs.

A third aspect of the invention relates to a method for determining a calibration parameter for a stereo camera in which the relative movement of the stereo camera and of a further object with respect to one another is analysed. With the aid of object images of the object which are recorded at least two times one after the other at a time interval by the stereo camera, the distance between the stereo camera and the object is determined each time. With the aid of the distances determined, an apparent change in distance between the stereo camera and the object is determined. The actual change in distance between the stereo camera and the object is determined with the aid of a system that is independent of the distance measurement system of the stereo camera. For example, the actual change in distance is provided by this independent system in the form of a piece of information. Dependent on the deviation of the apparent change in distance from the actual change in distance at least one calibration parameter for the determination of further distances to the object and/or to other objects is determined with the aid of object images recorded by the stereo camera.

With the aid of such an inventive method, a calibration parameter for a correct distance measurement can very easily be determined, as a result whereof the stereo camera can automatically be calibrated very accurately given known pitch and roll angles. As a result thereof, an on-the-fly calibration of the stereo camera system can be performed, for example while the vehicle, in which the stereo camera system is integrated, is moving.

A fourth aspect of the invention relates to a method for determining a calibration parameter for a stereo camera in which a relative movement of the stereo camera with respect to a further object is analysed. With the aid of object images of the object which are recorded at least two times one after the other at a time interval with the aid of the stereo camera, the distance between the stereo camera and the object is determined each time. On the basis of the distances determined, an apparent speed between the stereo camera and the object is determined. The actual speed between the stereo camera and the object is determined with the aid of a system that is independent of the distance measurement system of the stereo camera. Dependent on the deviation of the apparent speed from the actual speed, at least one calibration parameter for the determination of further distances between the stereo camera and the object and/or between the stereo camera and further objects is determined with the aid of object images recorded by the stereo camera.

By means of such an inventive method, a calibration parameter for a correct and accurate distance measurement can be determined very easily. The object images recorded with the aid of the stereo camera can thus be analysed and evaluated dependent on the calibration parameter determined. Given known pitch and roll angels, a stereo camera system can automatically be calibrated very accurately by the determination of the calibration parameter.

A fifth aspect of the invention relates to a device for determining a calibration parameter for a stereo camera in which a control unit analyses the relative movement between the stereo camera and a further object. The stereo camera records at least two times one after the other at a time interval object images of the object. With the aid of the object images recorded, the control unit determines each time the distance between the stereo camera and the object. With the aid of the distances determined, the control unit determines an apparent change in distance between the stereo camera and the object. With the aid of a system that is independent of the distance measurement system of the stereo camera, the control unit determines the actual change in distance between the stereo camera and the object. Dependent on the deviation of the apparent change in distance from the actual change in distance, the control unit determines at least one calibration parameter for the determination of further distances between the stereo camera and the object and/or between the stereo camera and further objects with the aid of object images recorded by the stereo camera.

By means of such an inventive device a calibration parameter can easily be determined with which then correct distances of objects with respect to a stereo camera can be determined. By determining the calibration parameter, a stereo camera system comprising the stereo camera can be automatically very accurately calibrated in a simple way. Preferably, the pitch angle and the roll angle of the single-image cameras of the stereo camera are determined before the calibration parameter is determined.

A sixth aspect of the invention relates to a device for determining a calibration parameter for a stereo camera in which a control unit analyses a relative movement between the stereo camera and a further object. The stereo camera records at least two times one after the other at a time interval object images of the object. The control unit determines with the aid of the object image recorded the respective distance between the stereo camera and the object. With the aid of the distances determined, the control unit determines an apparent speed between the stereo camera and the object. The control unit determines the actual speed between the stereo camera and the object with the aid of a system that is independent of the distance measurement system of the stereo camera. Dependent on the deviation of the apparent speed and the actual speed, the control unit determines at least one calibration parameter for the determination of further distances between the stereo camera 12 and the object and/or between the stereo camera 12 and further objects with the aid of object images recorded by the stereo camera.

By means of such an inventive device, the calibration parameter can be very easily determined, by means of which distances between the stereo camera and objects can then accurately be determined. In particular given known pitch and roll angles of the single-image cameras of the stereo camera with respect to one another, the entire stereo camera system can automatically be calibrated very accurately.

A seventh aspect of the invention relates to a method for determining a calibration parameter for a stereo camera in which the actual position of an object at a point in time is determined. The apparent distance between the stereo camera and the object is determined at this point in time with the aid of object images of the object which have been recorded by the stereo camera at this point in time. The actual position of the stereo camera at this point in time is determined. Further, the actual distance between the stereo camera and the object at this point in time is determined with the aid of the determined actual position. At least one calibration parameter is determined dependent on the deviation of the apparent distance from the actual distance, the calibration parameter serving for the determination of further distances between the stereo camera and the object and/or between the stereo camera and further objects with the aid of object images recorded by the stereo camera.

With the aid of such an inventive method, a calibration parameter for the correct determination of distances can be automatically determined in a simple manner, as a result whereof a so-called on-the-fly calibration is made possible.

An eighth aspect of the invention relates to a device for determining a calibration parameter for a stereo camera in which a first evaluation unit determines the actual position of an object at a point in time. A second evaluation unit determines the apparent distance between the stereo camera and the object at this point in time with the aid of object images of the object recorded by the stereo camera at this point in time. The second evaluation unit determines the actual position of the stereo camera at this point in time. The second evaluation unit determines the actual distance between the stereo camera and the object at this point in time with the aid of the determined actual positions. Further, the second evaluation unit determines at least one calibration parameter dependent on the deviation of the apparent distance from the actual distance. The calibration parameter serves for the determination of further distances between the stereo camera and the object and/or between the stereo camera and further objects with the aid of object images recorded by the stereo camera.

By means of such an inventive device a calibration parameter for calibrating a stereo camera system can easily be determined, as a result whereof a camera system calibrated in this way can accurately determine the distance between the stereo camera and an object. Such a device is in particular suitable for an on-the-fly calibration of the stereo camera.

Further aspects of the invention relate to a computer program for controlling the respective method sequences of the first, second, third and/or seventh aspect of the invention as well as to a respective data carrier for storing the source code and/or the compiled source code of the computer program.

BRIEF DESCRIPTION OF THE DRAWINGS

For a better understanding of the present invention, reference is made in the following to the preferred embodiments illustrated in the drawings and described by using specific terminology. However, it is pointed out that the scope of the invention is not to be restricted thereby since such variations and further modifications on the devices and/or the methods illustrated as well as such further applications of the invention as shown are to be considered as common current or future expert knowledge of the person skilled in this art. Embodiments of the invention are shown in the Figures.

DETAILED DESCRIPTION

Figure 1:
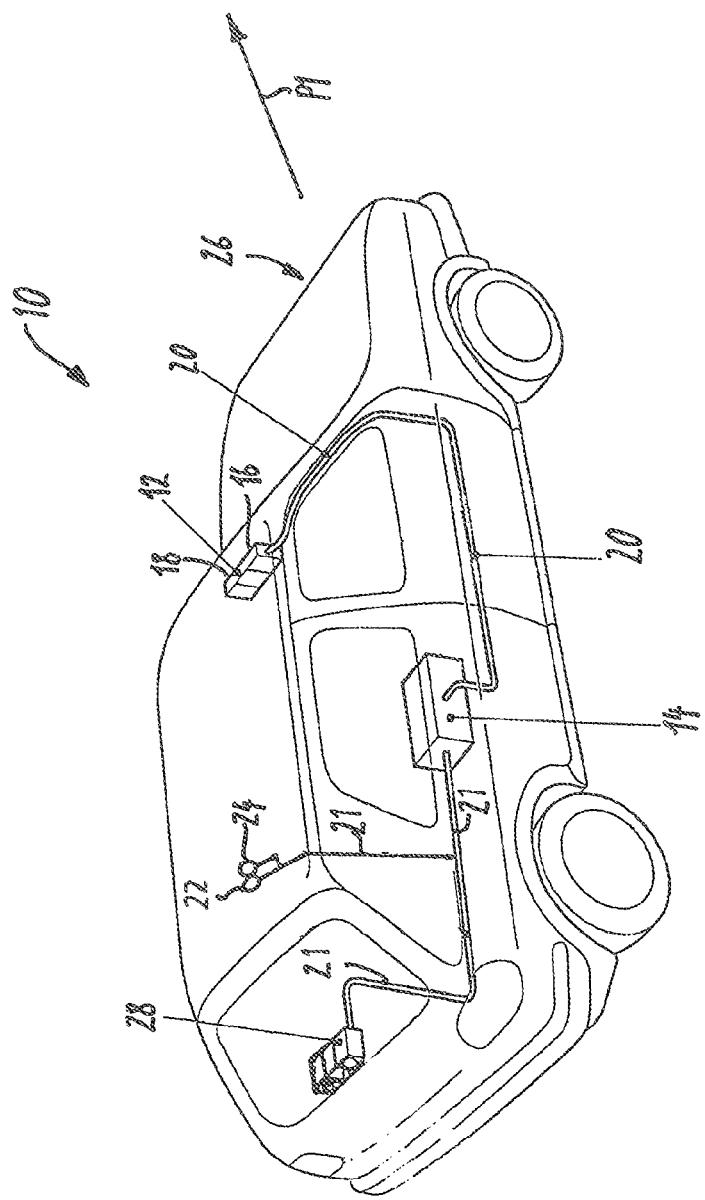
FIG. 1 shows an automobile having an inventive stereo camera system.

In FIG. 1, an automobile 10 is illustrated in which a stereo camera system comprising a stereo camera 12 and a control and evaluation unit 14 is provided. The stereo camera 12 comprises two single-image cameras 16, 18, which are arranged next to one another at a distance substantially transversely to the direction of travel P1. The optical axes of the cameras 16, 18 are oriented such that with the aid of the cameras 16, 18 an area in front of the automobile 10 is captured. The optical axes of the cameras 16, 18 preferably have a yaw angle with respect to one another.

In other embodiments, the two optical axes of the cameras 16, 18 can also be oriented exactly parallel with respect to one another. The cameras 16, 18 each simultaneously record a single image of more or less the same surrounding in front of the automobile 10, the cameras 16, 18 preferably having an optoelectric converter, in particular a CCD or a CMOS image sensor, and a fixed focal length lens system. The stereo camera system 12 is arranged in the area of the inner rear-view mirror of the automobile 10, the cameras 16, 18 having free visibility through the windshield of the automobile 10 in order to be able to capture the surrounding area to be imaged in front of the automobile 10.

The stereo camera 12 is preferably connected to the control and evaluation unit 14 via a first data bus 20. Image data of the images recorded with the aid of the cameras 16, 18 are transmitted to the control unit 14 via the data bus 20 and are evaluated thereat. This data bus 20 is preferably a fire wire data bus according to the IEEE norm or a LAN. A second data bus 21 is provided which is preferably a vehicle-integrated data bus and which is connected to further control units and sensors of the automobile 10. This data bus 21 is, for example, a CAN bus. The automobile 10 further has a receiving and evaluation unit 22 for a navigation system, preferably a satellite-based navigation system. Such a satellite-based navigation system is, for example, the GPS (Global Positioning System).

The automobile 10 further has a transmitting and receiving unit 24 for a wireless communication network, preferably for a wireless network for the transmission of data. Such a communication network can, for example, be a GSM network (Global Standard For Mobile Communication), an ad hoc wireless-LAN, a bluetooth network or another communication network. Via this communication network, the own position of the automobile 10 and speed with respect to other vehicles, in particular with respect to other automobiles, can be transmitted via the transmitting and receiving unit 24, and the position and/or speed of another vehicle, preferably of a vehicle that is within the capture area of the single-image cameras 16 and 18 can be received. In particular, the information transmitted, i.e. the sent and the received information, includes a time stamp, preferably having the time of an atomic clock. The time for generating the time stamp is preferably determined with the aid of the receiving and evaluation unit 22 of the satellite-based navigation system provided in the automobile 10 and a receiving and evaluation unit of the satellite-based navigation system provided in the other vehicle communicating with the automobile 10 via the wireless communication network.

The receiving and evaluation unit 22 of the satellite-based navigation system and the transmitting and receiving unit 24 are likewise connected to the control and evaluation unit 14 of the stereo camera system via the internal data bus 21. Thus, via the communication network, for example, the position of an oncoming vehicle can accurately be determined. Due to the knowledge of the own position in space, it can thus be verified whether a distance measurement made with the aid of the stereo camera system results in the same distance between the positions of the automobile 10 and the oncoming vehicle. In case of deviations, a calibration parameter, for example, a correction value can be determined. In particular, by means of this method, the yaw angle which is of decisive importance for distance measurement can be determined and possibly be corrected.

As explained in the following with reference to FIG. 10, in particular the roll angle and the pitch angle of the respective single-image cameras 16, 18 can be determined with the aid of several single images recorded with the aid of the single-image cameras 16, 18. Stationary objects, such as traffic lights, traffic signs or buildings can likewise transmit their position via the communication network to the transmitting and receiving unit 24 of the automobile 10. Then, for example, the yaw angle between the optical axes of the single-image cameras 16, 18 can be determined with the aid of an object tracking of the stationary object over at least two images which each have been simultaneously recorded at a preset interval with the aid of the single-image cameras 16, 18, and thus a preset yaw angle can be checked.

Alternatively, an object recorded with the aid of the cameras 16, 18 can be traced over several images by means of a tracking method. Variations in the brightness of the object can likewise be recorded with the aid of at least one camera 16, 18 at a preset image frequency, the sampling generating a signal of the sampled brightness curve with the aid of the image frequency or, respectively, sampling rate, as will be explained in more detail in the following with reference to FIGS. 13 to 18. As a result thereof, it can, for example, be determined whether the object is a light source that is operated at an alternating voltage having the frequency of a common power supply network.

On the basis of this object property, it can be assumed with high probability that the light source concerned is a stationary object. As a result thereof the position of the object can be considered as being stationary. The position of the object or, respectively, the distance of the object with respect to the automobile 10 can be detected several times, with the relative speed between the automobile 10 and the stationary object being detected with the aid of the satellite-based navigation system or auxiliarily with another speed measurement device.

In another alternative, the stationary object can likewise comprise a measuring device which acquires the position of the automobile 10 and its relative speed with respect to the object. Such a measuring system can, for example, be a radar or a sonar system. The measured data can then be transferred via the communication network to the transmitting and receiving unit 24 of the automobile 10. With the aid of this information, the yaw angle of the stereo camera can also be determined in that the distance of the stereo camera 12 with respect to this object is determined several times.

The arrangement of the stereo camera 12, the control and evaluation unit 14 as well as of the transmitting and receiving unit 24 for the communication network as well as the receiving and evaluation unit 22 for the satellite-based navigation system are illustrated in FIG. 1 merely schematically and exemplarily. It is obvious that these can also be arranged at other suitable positions in the automobile 10. For example, the stereo camera 12 can also be arranged in the front area 26, for example in the middle between the headlights of the automobile 10. In addition or alternatively, a further stereo camera 28 can also be provided in the rear of the automobile 10, which camera is likewise connected to the control and evaluation unit 14 of the stereo camera system. The stereo camera 28 is arranged within the automobile 10 behind its rear windscreen. The two single-image cameras of the stereo camera 28 capture an area behind the automobile 10 and can determine the distance with respect to objects behind the automobile 10. In particular, with the aid of the stereo camera 28, an object tracing of objects moving relative to the automobile 10, preferably an approach of a vehicle toward the automobile 10 can be recorded. The main direction of travel of the automobile 10 is indicated with an arrow having the reference sign P1.

Figure 2:
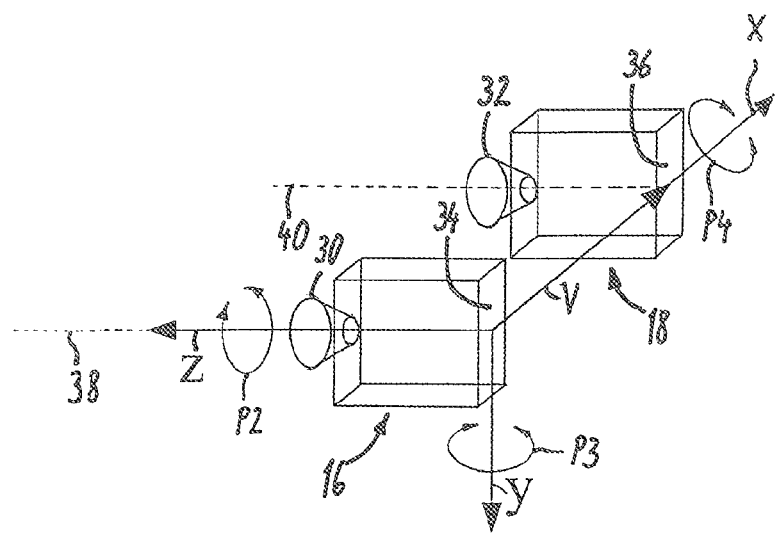
FIG. 2 is a schematic three-dimensional illustration of the single-image cameras of the inventive stereo camera system.

In FIG. 2, the single-image cameras 16, 18 of the stereo camera 12 are schematically shown in a three-dimensional illustration. The same elements have the same reference signs. Given this schematic illustration, the non-visible lines have likewise been illustrated as solid lines. The lens system of the camera 16 has the reference sign 30 and the lens system of the camera 18 has the reference sign 32. The optical axis of the camera 16 has the reference sign 38 and the optical axis of the camera 18 has the reference sign 40. The camera 16 is also referred to as the first single-image camera and the camera 18 is also referred to as the second single-image camera.

For simplification, reference is made to a rectangular camera coordinate system for specifying the location and the position of the single-image cameras 16, 18, in particular of the optical axes of the single-image cameras 16, 18, with respect to one another, the axes of which camera coordinate system being referenced X, Y and Z in FIG. 2. The camera coordinate system can have an arbitrary position with respect to other coordinate systems. However, each location and each position of each single-image camera 16, 18 can also be specified with reference to another coordinate system, for example, the world coordinate system or a defined image coordinate system. A position in the camera coordinate system can easily be converted into a position in the world coordinate system or, respectively, into a position in the image coordinate system, when the positions of the two coordinate systems with respect to one another are known. Such a camera coordinate system is also used for evaluating the images recorded with the aid of the stereo camera 12 by the control and evaluation unit 14.

The coordinate origin of the camera coordinate system is defined in the point of intersection of the optical axis 38 of the first single-image camera 16 with the image plane 34 of this first single-image camera 16. The optical axis 38 of the first single-image camera 16 is defined as the Z-axis of the camera coordinate system. The vector from the coordinate origin to the point of intersection of the optical axis 40 of the second single-image camera 18 and the Z-axis establish a plane, in which the X-axis extending orthogonally to the Z-axis is located. The Y-axis extends orthogonally to the X-axis and orthogonally to the Z-axis.

In the embodiment of FIG. 2, the point of intersection of the optical axis of the second single-image camera 18 with its image plane also lies on the X-axis of the camera coordinate system. The distance between the points of intersection of the optical axes 38, 40 of the respective camera 16, 18 with their image planes 34, 36 is referred to as a base width, the single-image cameras 16, 18 being arranged offset by a value V=(base width, 0, 0), when these points of intersection lie on the X-axis as in the embodiment according to FIG. 2.

Due to the coincidence of the optical axis 38 of the first single-image camera 16 with the Z-axis, the determination of the relative positions of the optical axes 38, 40 of the single-image cameras with respect to one another is considerably simplified. Further, by means of this camera coordinate system a dependency on other coordinate systems is avoided. When the single-image cameras 16, 18 are arranged directly next to one another in a horizontal plane in the world coordinate system, the X-axis and the Z-axis of the camera coordinate system run substantially horizontally in the world coordinate system and the Y-axis runs substantially vertically. In particular when the stereo camera system is installed in vehicle 10 moving in the three-dimensional space of the world coordinate system, such a camera coordinate system has the advantage that the positions of the coordinate systems with respect to one another do not have to be continuously determined and do not directly have to be taken into account in the evaluation and analysis of the recorded images, for example in the determination of the distance of a recorded object.

The angles which are decisive for the determination of objects are defined as follows:

The roll angle is the angle by which a single-image camera is rotated about the Z-axis. Such a rotation is indicated in FIG. 2 by the arrow P2. By means of the definition of the camera coordinate system, the first single-image camera 16 has a roll angle of 0°. An angle position of the second single-image camera 18 deviating from 0°, is the roll angle error or the roll angle of the stereo camera 12.

The pitch angle is the angle by which a single-image camera is rotated about the X-axis. Such a rotation is indicated in FIG. 2 by the arrow P4. By the definition of the camera coordinate system, the first single-image camera 16 has a pitch angle of 0°. An angle position of the second single-image camera 18 deviating from 0° is the pitch angle error or the pitch angle of the stereo camera 12.

The yaw angle is the angle by which a single-image camera is rotated about an Y-axis. Such a rotation is indicated in FIG. 2 by the arrow P3. By means of the definition of the camera coordinate system, the first single-image camera 16 has a yaw angle of 0°. An angle position of the second single-image camera 18 deviating from 0° is the yaw angle error or the yaw angle of the stereo camera 12.

The camera coordinate system is preferably a right-hand coordinate system, with the angle information on the roll angles, the pitch angles and the yaw angles referring to the directions of these angles in the right-hand coordinate system. The terms roll angle, pitch angle and yaw angle substantially correspond to the angles used for the orientation of an airplane which are referenced in the same way. Alternatively, a single-image camera coordinate system can also be provided each, the position of the axes of the single-image camera coordinate systems with respect to one another being analysed.

Further, the images which are simultaneously taken with the aid of the single-image cameras 16, 18 of the stereo camera 12 are also referred to as an image pair.

Figure 3:
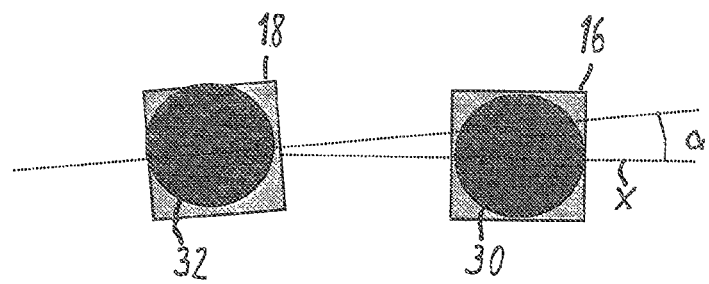
FIG. 3 is a front view of the single-image cameras according to FIG. 2, in which the single-image cameras have a roll angle difference α with respect to one another.

In FIG. 3, the single-image cameras 16, 18 according to FIG. 2 are illustrated in a front view through the windshield of the automobile 10. The single-image camera 18 is arranged with respect to the camera 16 rotated by a roll angle α about the Z-axis. The roll angle α of the stereo camera 12 is determined with the aid of an image analysis and evaluation method and is taken into account in the subsequent image processing and image analysis.

Figure 4:
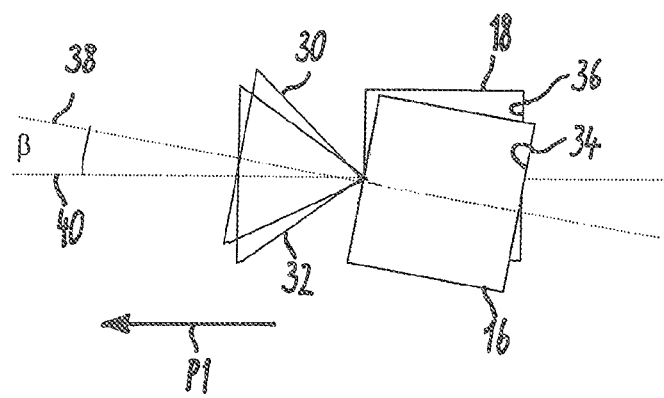
FIG. 4 is a side view of the single-image cameras according to FIG. 2, in which the single-image cameras have a pitch angle difference β.

In FIG. 4, a side view of the cameras 16, 18 is illustrated. The pitch angle of the first single-image camera 16 is defined to be 0° by the definition of the camera coordinate system. As a result thereof, the second single-image camera 18 has a pitch angle β. With the aid of an image pair recorded by the single-image cameras 16, 18 the pitch angle β of the single-image camera 18 can be determined and can then be taken into account in the processing and the analysis of further images.

Given an arrangement of the single-image cameras 16, 18 in the world coordinate system horizontally next to one another, the single-image camera 18 captures at least also an area below the area captured with the aid of the single-image camera 16. As a result thereof, the areas captured with the aid of the single-image cameras 16 and 18, i.e. the images recorded with the aid of the single-image cameras 16, 18, do not completely correspond to one another.

Figure 5:
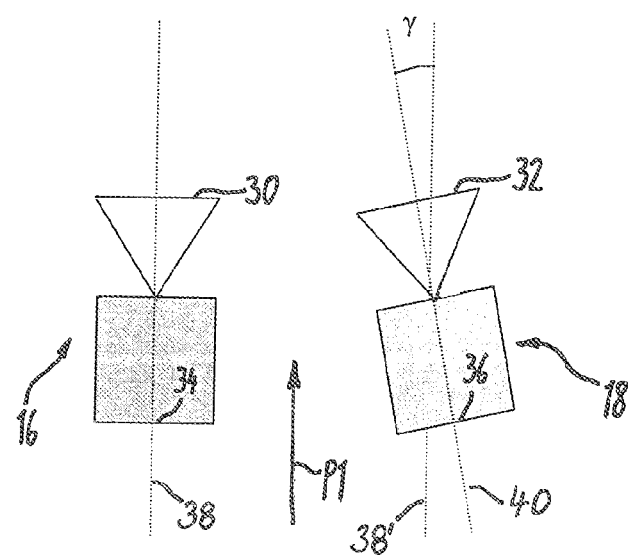
FIG. 5 is a top view of the single-image cameras according to FIG. 2 in which the single-image cameras have a yaw angle difference γ.

In FIG. 5, the single-image cameras 16, 18 of the stereo camera 12 with their optical axes 38, 40 are illustrated in a top view on the X-Z-plane of the camera coordinate system. The yaw angle of the first single-image camera 16 amounts to 0° as a result of the definition of the camera coordinate system. The second single-image camera 18 has a yaw angle γ as a result of its rotation about the Y-axis.

When the pitch angle and the roll angle α mount to 0°, the optical axes 38, 40 intersect one another under the yaw angle γ. The yaw angle γ of the second single-image camera 18 is, as already mentioned, also referred to as a yaw angle error or as a yaw angle of the stereo camera 12.

For clarification purposes, the optical axis 38 has been shifted in parallel so that it intersects the optical axis 40 in its point of intersection with the image recording area 36 of the single-image camera 18. The optical axis 38 which is shifted in parallel is referred to as 38'. The optical axes 40, 38' establish the yaw angle γ by which the optical axes 38, 40 of the single-image cameras 16, 18 are arranged in a rotated manner. For an accurate distance measurement, i.e. for an exact determination of the distance of an object recorded with the aid of the single-image cameras 16, 18, the knowledge of the exact yaw angle γ is absolutely necessary.

Figures 6, 7, 8:
FIG. 6 shows an approach of an object toward the stereo camera system determined with the aid of the stereo camera system according to FIG. 1, which approach is indicated with the aid of the distances between the stereo camera system and the object at the points in time T0 to T10, the actual yaw angle γ being smaller than the preset yaw angle.
FIG. 7 shows the approach of the object toward the stereo camera system at the points in time T0 to T10, in contrast to FIG. 6 the actual yaw angle corresponding to the preset yaw angle.
FIG. 8 shows the approach of the object toward the stereo camera system at the points in time T0 to T10, the preset yaw angle γ being greater than the actual yaw angle.

FIG. 6 illustrates the position of an object illustrated by means of a dot during the approach toward the stereo camera 12 at the points in time T0 to T10. The cameras 16, 18 of the stereo camera system simultaneously record an image in which each time the object illustrated as a dot is determined. With the aid of the two images, the preset pitch, roll and yaw angles of the cameras 16, 18, the distance of the object is determined at each of the points in time T0 to T10. The cameras 16, 18 of the stereo camera system take two image pairs at a time interval of $0.0\overline{45}$ seconds or, respectively, at an image repetition frequency of 22 Hz, with which image pairs the distance is then determined.

The object according to FIG. 6, however, actually approaches the stereo camera 12 at a uniform speed. However, the distance apparently covered by the object between two image pairs, i.e. between two points in time T0 to T10, becomes shorter every time, although the distance between the stereo camera 12 and the object between two points in time T0 to T10 is each time the same. The distance covered by the object between two points in time is illustrated with the aid of the arrows shown above the objects. The deviation between the distance actually covered and the covered distance of the object measured with the aid of the stereo camera 12 between the respective points in time T0 to T10 has to be put down to an incorrectly preset yaw angle γ. In the illustration according to FIG. 6, a smaller yaw angle γ is preset for the evaluation of the images recorded as compared to the yaw angle γ actually present between the optical axes 38, 40 of the cameras 16, 18.

In FIG. 7, the position of the object during the approach toward the stereo camera 12 at the points in time T0 to T10 is illustrated with a correctly preset yaw angle γ. The stereo camera system determines that between each two points in time T0 to T10, the same distance is covered between the stereo camera 12 and the object. This corresponds to the actual approach of the object toward the camera 12.

In FIG. 8, the position of the object during the approach toward the stereo camera 12 at the points in time T0 to T10 is illustrated, with a too large yaw angle γ being preset. As a result of the too large preset yaw angle γ, the distance covered during the approach of the object toward the camera 12 is determined to be shorter given a greater distance of the object from the stereo camera 12 as compared to the actually covered distance. The actually covered distance is correctly illustrated in FIG. 7.

Between two points in time T0 to T10, there is always the same amount of time, for example $0.0\overline{45}$ seconds. It is thus obvious from FIGS. 6 to 8, that in the case of a too small set yaw angle γ according to FIG. 6, the covered distance between object and stereo camera 12 measured between two points in time T0 to T10 increases with increasing distance between the object and the stereo camera 12 and the measured distance covered becomes smaller with increasing distance between the stereo camera 12 and the object given a too large set yaw angle γ according to FIG. 8.

Figure 9:
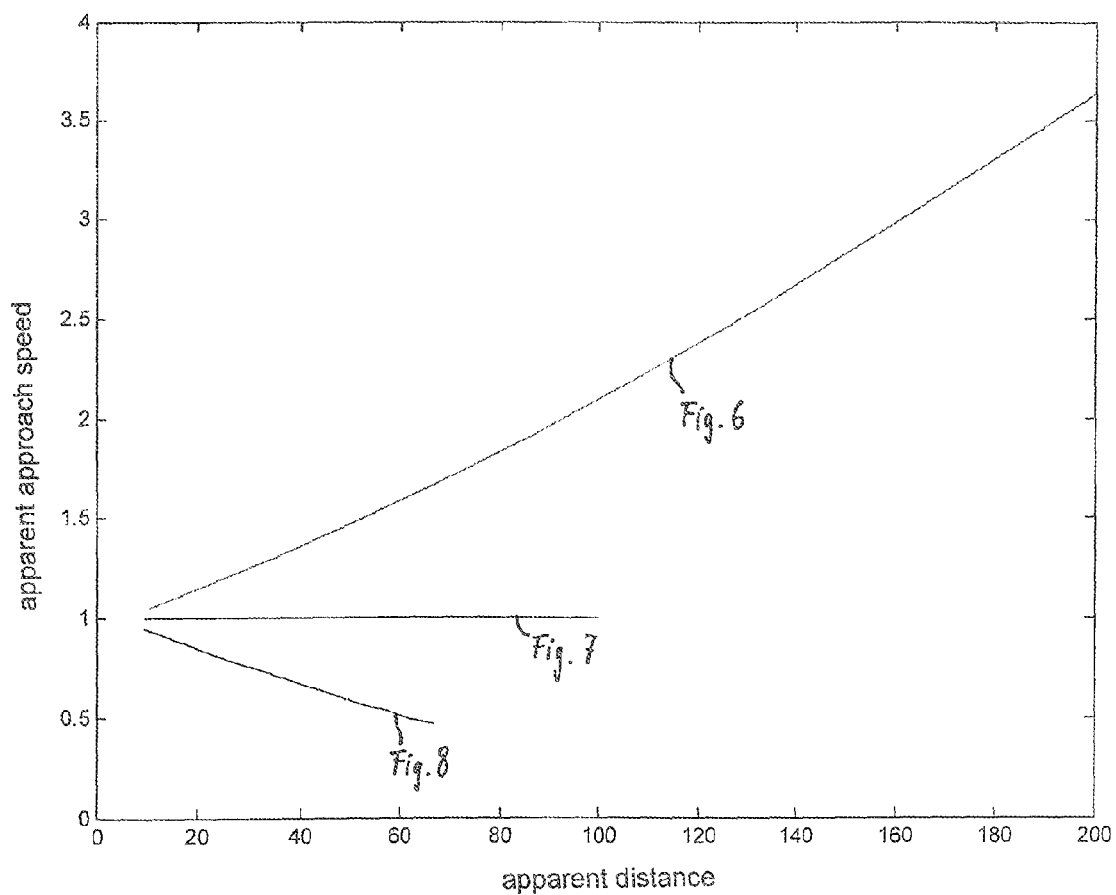
FIG. 9 is a diagram showing the relationship between the apparent distance and the apparent approach speed of the determined approach of the object at the points in time T0 to T10 according to FIGS. 6 to 8.

In FIG. 9 the relationships between the determined apparent distance and the apparent approach speed of the object toward the stereo camera 12 according to FIGS. 6 to 8 are illustrated in a diagram. The graphs illustrated therein have as reference signs the respective figure designations of FIGS. 6 to 8. From FIG. 9, the principle of the incorrectly determined approach speed as a result of an incorrectly preset yaw angle γ for the evaluation of the images recorded with the aid of the cameras 16, 18 becomes obvious, which principle has already been explained in connection with FIGS. 6 to 8.

Given a correctly set yaw angle γ according to FIG. 7, the apparent, i.e. the determined, approach speed corresponds to the actual approach speed between the object and the stereo camera 12. The approach speed constantly amounts to 1. In the case of a yaw angle γ set too small, the apparent approach speed of the object increases with increasing apparent distance as a result of the increasing error with increasing distance. Given a too large preset yaw angle γ according to FIG. 8, with increasing distance between the object and the stereo camera 12 an increasingly lower apparent approach speed is determined with the aid of the stereo camera system.

Figure 10:
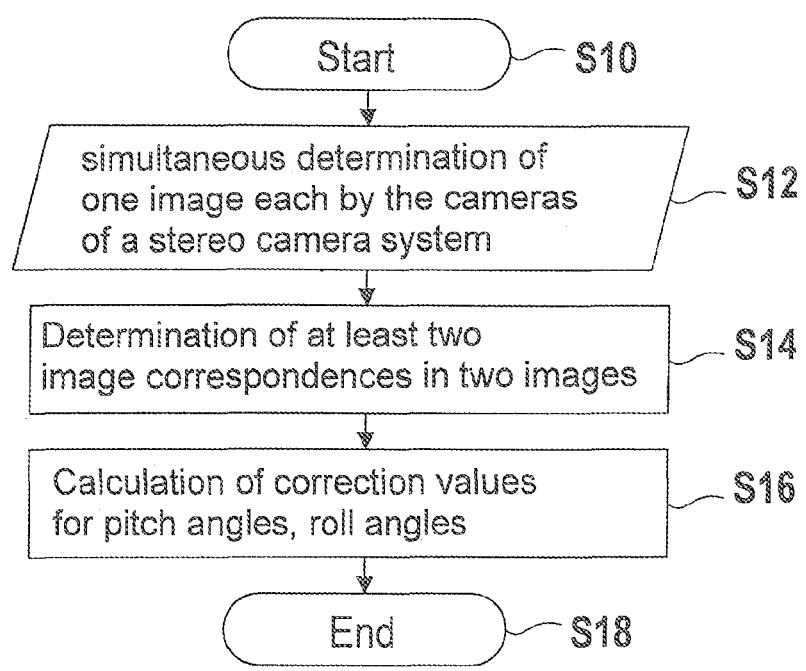
FIG. 10 is a flow chart for determining correction values for pitch angles and roll angles.

In FIG. 10, a flow chart for determining correction values for the pitch angle and the roll angle of the stereo camera 12 is illustrated. In step S10, the sequence is started. Subsequently, in step S12 one image each is simultaneously recorded with the aid of the cameras 16, 18 of the stereo camera system. Thereafter, in step S14, at least two images correspondences are defined in both images. For more accuracy, in alternative sequences more than two image correspondences, preferably at least five correspondences, are defined in both images. In practice, two to ten image correspondences have proven advantageous.

In step S16, then with the aid of calculation steps derived from the projective geometry, a calculation of correction values for preset pitch angles β and roll angles α is calculated. The values determined in this way for pitch angles β and roll angles α are then stored as new preset values for pitch angles β and roll angles α in the control and evaluation unit 14 of the stereo camera system and are taken into account in the subsequent evaluation of further recorded images, in particular in the distance measurement with the aid of the recorded image pairs. Subsequently, the sequence is terminated in step S18.

The sequence described in connection with FIG. 10 is preferably executed repeatedly, for example after every recording of an image pair.

Figure 11:
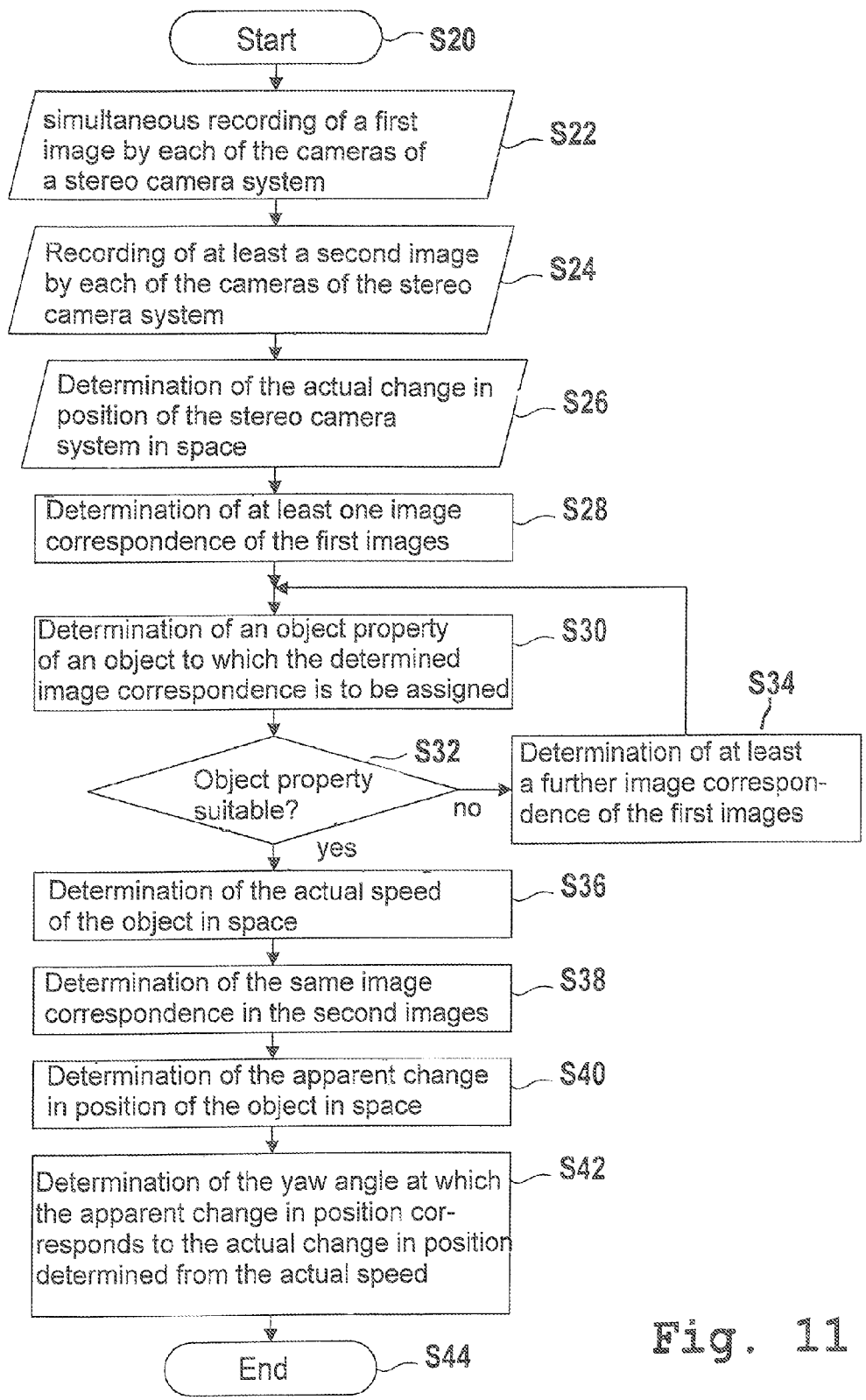
FIG. 11 is a flow chart for determining the actual yaw angle γ of the stereo camera system according to a first embodiment.

In FIG. 11, a flow chart for determining an actual yaw angle γ between the cameras 16, 18 of the stereo camera system is illustrated. The sequence is started in step S20. Subsequently, in step S22 a first image is simultaneously taken with each of the cameras 16, 18 of the stereo camera system. After a preset amount of time, in particular after $0.0\overline{45}$ seconds, at least a second image is recorded with the aid of each of the cameras 16, 18. In step S26, then the change in the actual position of the stereo camera 12 in space between the recording of the first images and the recording of the second images is determined. For example, this change in position is determined with the aid of a satellite-based navigation system and/or a speed measurement value provided by a speed measurement system of the automobile 10, in which the stereo camera 12 is fixed.

In step S28, the control and evaluation unit 14 of the stereo camera system then determines at least one image correspondence in the first images. The image correspondence is preferably determined with the aid of known image evaluation and image analysis methods. Subsequently, in step S30 an object property of an object is determined, to which the image correspondence is to be assigned. The determination of the object property can, for example, take place with the aid of a method by which the brightness curve of an image of the object recorded with the aid of the cameras 16, 18 is sampled and the sampled brightness curve is compared with respect to prominent correspondences with preset brightness curves. As a result thereof, it can, for example, be verified whether the object is a light source or a lamp that is powered with an alternating voltage of a power supply network.

Based on this object property, it can for example be assumed for the further procedure that the object determined is a stationary object or, a stationary light source. In step S32, it is subsequently verified whether the determined object property of the object can be used in a suitable manner for the further sequence. If this is not the case, then subsequently, in step S34, at least a further image correspondence of the first images is defined. Thereafter, in step S30 again an object property of an object is determined, to which the image correspondence, which is then determined in step S34, is to be assigned.

If it is determined in step S32, that the determined object property seems to be useful for the further procedure, subsequently, in step S36 the actual speed of the object in space is determined. If it can be reasoned from the object property that the object determined is a stationary object, the speed of the object in space is 0 m/s. Alternatively, both the object property as well as the speed of the object in space can be determined by a communication device connected to this object preferably via a communication network or by a further independent measuring device and be transferred to the automobile 10. Subsequently, in step S38 the same image correspondence is determined in the second images. Then, in step S40, the apparent change in position of the object in space is determined. In step S32, then the yaw angle γ is determined, in which the apparent change in position corresponds to the actual change in position determined from the actual speed. The sequence is subsequently terminated in step S44.

Alternatively, in step S40, the apparent speed of the object in space can be determined. Thereafter, in step S42 the yaw angle is determined, at which the apparent speed corresponds to the actual speed. The determined yaw angle γ serves as a calibration parameter for calibrating or for adjusting the stereo camera system. For calibration, the determined yaw angle can be used in the evaluation of the images recorded with the aid of the stereo camera 12 in the determination of the distance between the stereo camera 12 and a further object.

Figure 12:
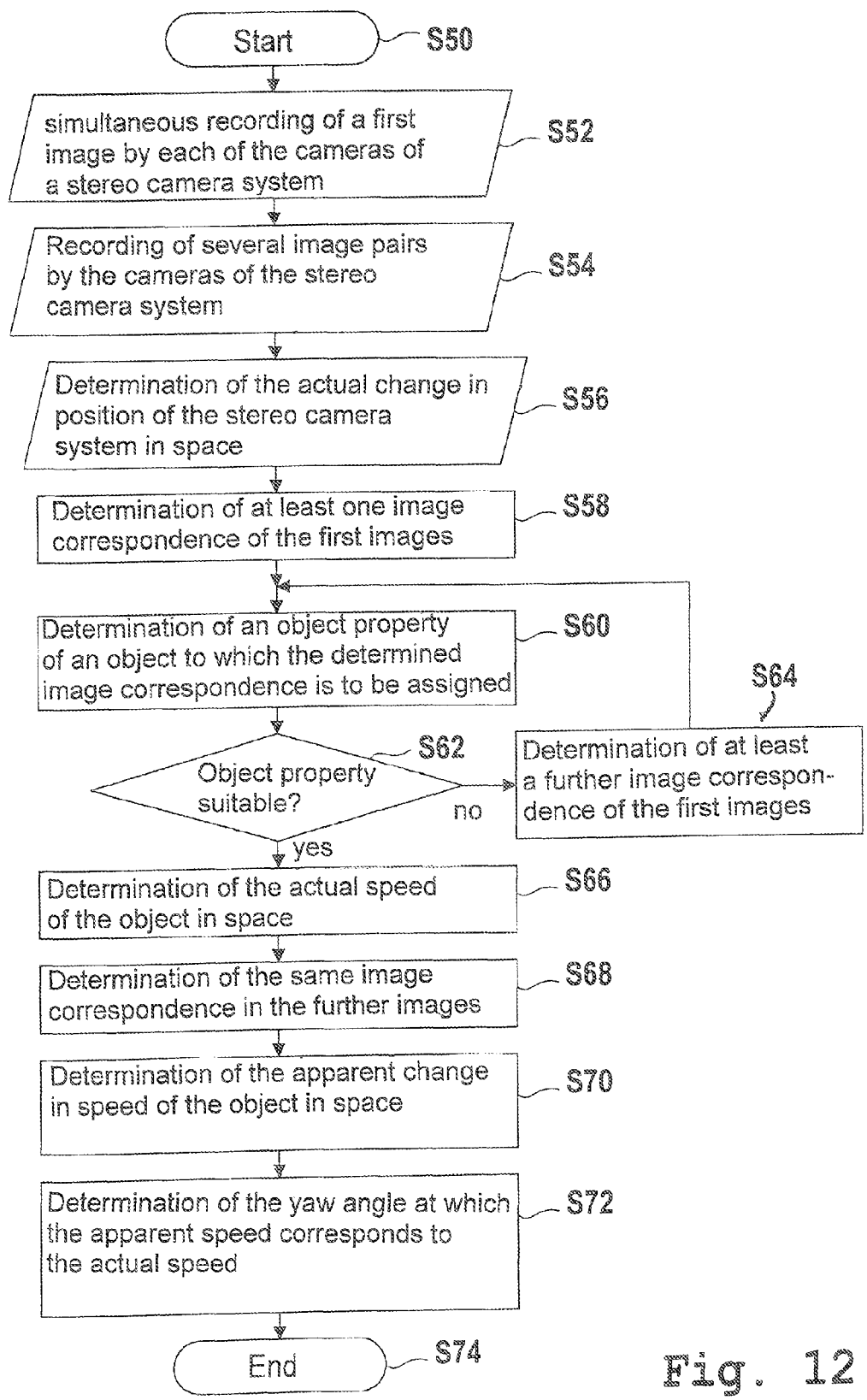
FIG. 12 is a flow chart for determining the actual yaw angle γ according to a second embodiment.

In FIG. 12, an alternative sequence with respect to the sequence illustrated in FIG. 10 for determining the yaw angle γ of the cameras 16, 18 of the stereo camera 12 is illustrated. The sequence is started in step S50. Subsequently, in step S52 each time a first image, i.e. a first image pair, is simultaneously recorded with the aid of the cameras 16, 18 of the stereo camera system. In step S54, then at a fixed preset time interval several image pairs are recorded one after the other by the cameras 16, 18. In step S56, then the actual change in position of the stereo camera 12 in space at the time intervals is determined.

In step S58, at least one image correspondence is defined in the first images. Subsequently, in step S60 an object property of an object is determined with the aid of several image pairs recorded one after the other, to which object property the defined image correspondence is to be assigned. Subsequently, it is verified in step S62, whether the determined object property is suitable for the further procedure, i.e. whether the actual yaw angle γ of the stereo camera 12 or, respectively, of the camera 18 with respect to the camera coordinate system can be determined with the aid of the object. If this is not the case, then subsequently, in step S64 at least one image correspondence in the recorded images is determined and the sequence is continued in step S60.

If, however, it is determined in step S62 that the object property is suitable for the further procedure or, respectively, that the object is suitable for the further procedure, then in step S66 the actual speed of the object in space is determined. This can be done in the same manner as described in connection with FIG. 11, S36. In step S68, the same image correspondence is defined in the images of the further image pairs. Subsequently, in step S70 the image correspondence defined in the further image pairs in step S68 is traced, preferably with the aid of a so-called tracking method, an apparent speed of the object in space being determined over this tracking interval.

The determination of the speed with the aid of several further image pairs increases the accuracy of the determined apparent speed. In step S72, then the yaw angle γ is determined, at which the apparent speed corresponds to the actual speed. Subsequently, the sequence is terminated in step S74. Also given a procedure according to FIG. 12, the determined yaw angle γ can be used as a calibration parameter for the further evaluation of images recorded with the aid of the single-image cameras or for re-calibration of at least one single-image camera of the stereo camera 12. The accuracy and reliability of the sequences according to FIGS. 11 and 12 can be further increased in that several image correspondences are defined in the image pairs which are preferably to be assigned to the same object.

Figure 13:
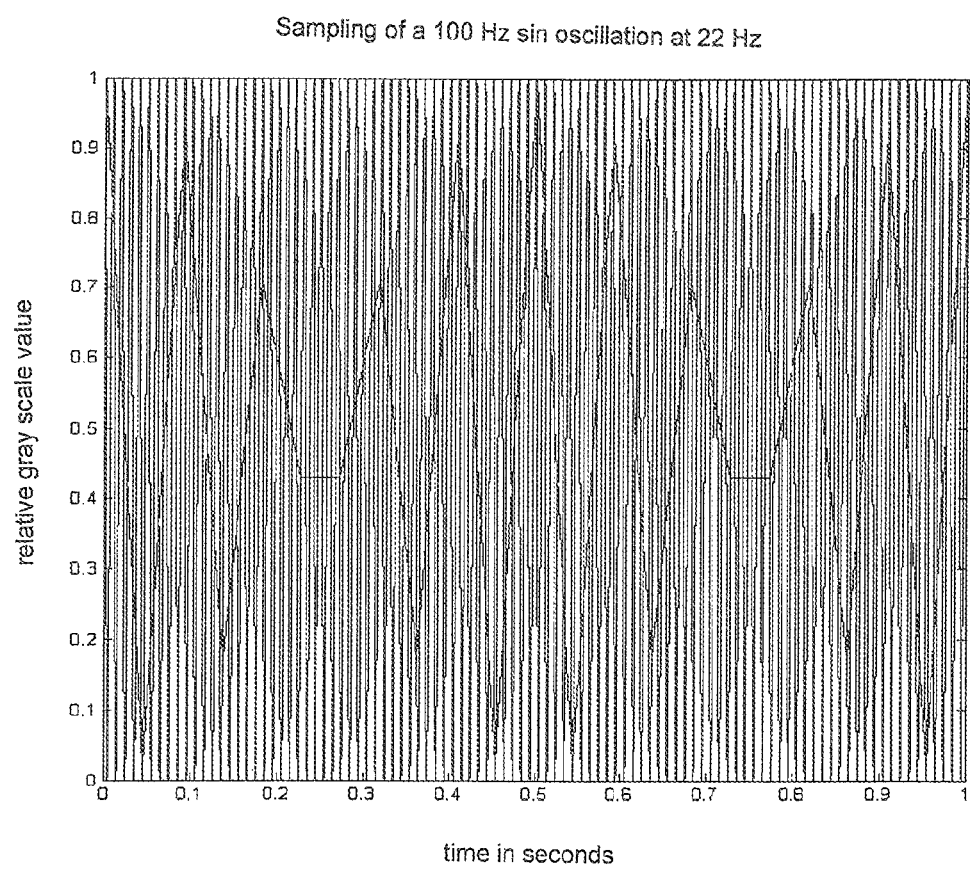
FIG. 13 is a diagram comprising graphs which illustrate the superposition of the brightness variations of a lamp operated at an alternating voltage of 50 Hz at a sampling rate of 22 Hz, a brightness variation of the lamp of 100 Hz and the brightness curve generated by the sampling being illustrated.

In FIG. 13, the brightness variation curve of a light source powered with an alternating voltage of 50 Hz is illustrated, the brightness variation being determined and specified as a relative gray scale value with the aid of an image sequence recorded by the cameras 16, 18 of the stereo camera system.

This camera 16, 18 generates images at an interval of $0.0\overline{45}$ seconds, i.e. images of the object at a frequency of 22 Hz. The brightness of the object in these images is determined. With the aid of the determined brightness values, a resulting brightness curve is determined. A light source powered with an alternating voltage of 50 Hz, has a brightness variation of 100 Hz. The actual brightness and the brightness of the light source resulting from the sampling is entered on a scale of 0 to 1 as a relative value on the Y-axis of the diagram according to FIG. 13. On the X-axis, the temporal sequence of 0 to 1 seconds is entered. Due to the sampling of the 100 Hz brightness variation of the light source at a sampling rate of 22 Hz, there results a prominent brightness curve which in particular is the superposition of the 100 Hz brightness variation and the 22 Hz sampling rate. Such a superposition is also referred to as beat.

Figure 14:
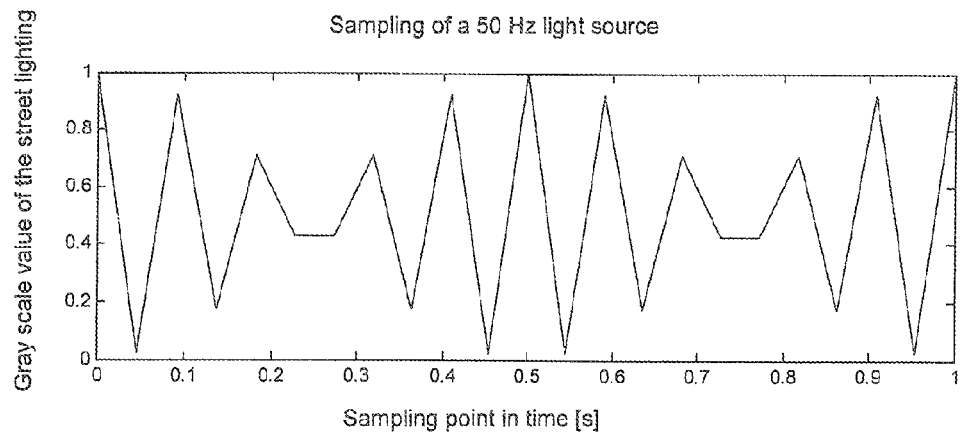
FIG. 14 is a diagram showing the brightness curve generated by the sampling according to FIG. 13.

In FIG. 14, the curve of the 100 Hz brightness variation, sampled at a sampling rate of 22 Hz, of the light source powered with a 50 Hz alternating voltage is illustrated. There results the brightness curve already illustrated in FIG. 13, which subsequently is illustrated in FIG. 14 without the 100 Hz fundamental component of the light source powered with a 50 Hz alternating voltage.

Figure 15:
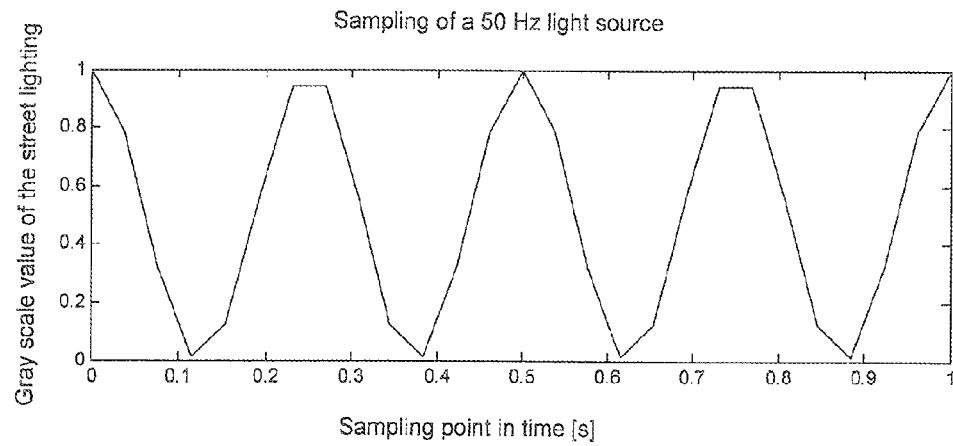
FIG. 15 is a diagram of a brightness curve of the sampled signal resulting from a sampling of the brightness curve of the lamp at an unfavorable sampling rate.

In FIG. 15, the resulting brightness curve of the sampling of the 100 Hz brightness variation of a light source powered with a 50 Hz alternating voltage is illustrated. The sampling rate for determining the brightness curve illustrated in FIG. 15 amounts to approximately 26 Hz. As a result thereof, there results a less prominent brightness curve than illustrated in FIG. 14. However, by means of a comparison of the brightness curve illustrated in FIG. 15 with possible preset brightness curves it can be determined that the object concerned is a light source powered with a 50 Hz alternating voltage, in particular a public street lighting.

Figure 16:
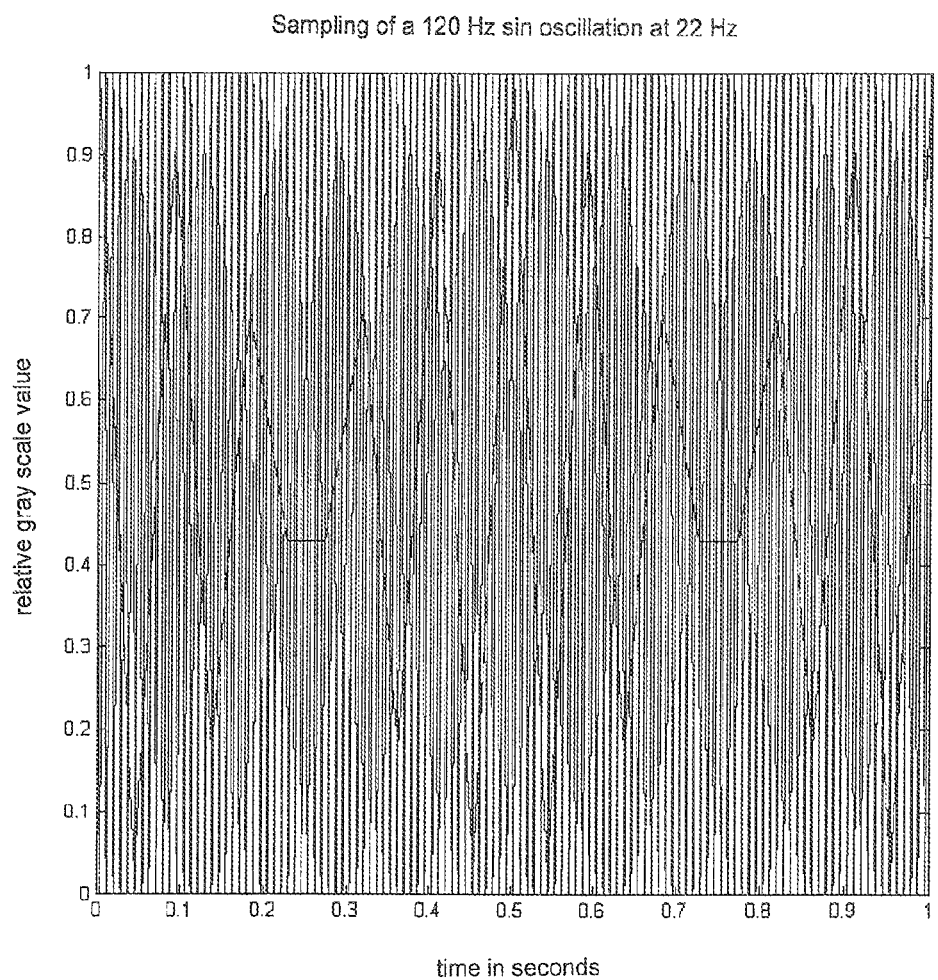
FIG. 16 is a diagram comprising graphs which illustrate the superposition of the brightness curve of a lamp operated at 60 Hz at a sampling rate of 22 Hz, the brightness curve of the sampled signal generated by the sampling being illustrated.

In FIG. 16, the sampling of a 120 Hz brightness variation, at a sampling rate of 22 Hz, of a light source powered with a 60 Hz alternating voltage is illustrated as a relative gray scale value as a function of the time. The brightness curve created by the sampling substantially corresponds to a brightness curve of a light source powered with a 50 Hz alternating voltage and having a brightness variation of 100 Hz, which brightness curve is generated by a sampling of 22 Hz.

Figure 17:
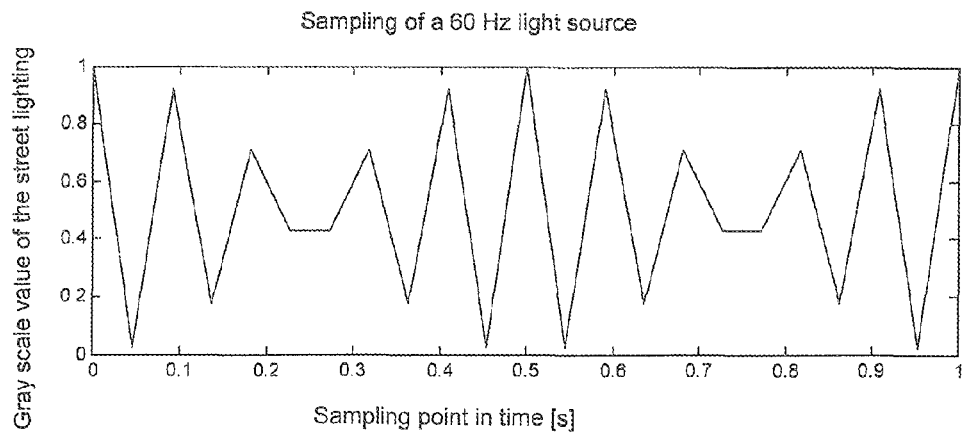
FIG. 17 is a diagram in which the sampled brightness curve according to FIG. 16 is separately illustrated.

In FIG. 17, the brightness curve generated by the sampling at a sampling rate of 22 Hz of the 60 Hz alternating voltage-operated light source according to FIG. 16 is illustrated without the fundamental component of 120 Hz. Thus the sampling rate of 22 Hz has the advantage that the brightness curves, generated as a result of the sampling, of the brightness variation of a light source operated at a 50 Hz alternating voltage and a light source operated at a 60 Hz alternating voltage substantially correspond to one another, as a result whereof the evaluation is considerably simplified. Due to the differing frequencies of the alternating voltages in public power supply networks, for example in Europe and in the United States (Europe: 50 Hz; USA: 60 Hz), it can be determined without a change in the sampling rate and without other comparison curves whether the light source is a light source operated at a 50 Hz alternating voltage or 60 Hz alternating voltage and thus is a stationary object.

However, alternatively, given a sampling at other sampling rates, differences in the brightness curves can be used to determine whether the light source is a light source operated at a 50 Hz alternating voltage or at a 60 Hz alternating voltage. In order to implement the inventive method for determining an object property, in particular the object property of a light source operated at 50/60 Hz alternating voltage, however also different brightness curves can be generated by the sampling with the aid of images recorded one after the other, which are then evaluated and compared with preset brightness curves. Given a predominantly supposable correspondence, it is then determined that the object concerned is a light source or, respectively, a lamp operated at a frequency of 50/60 Hz.

Figure 18:
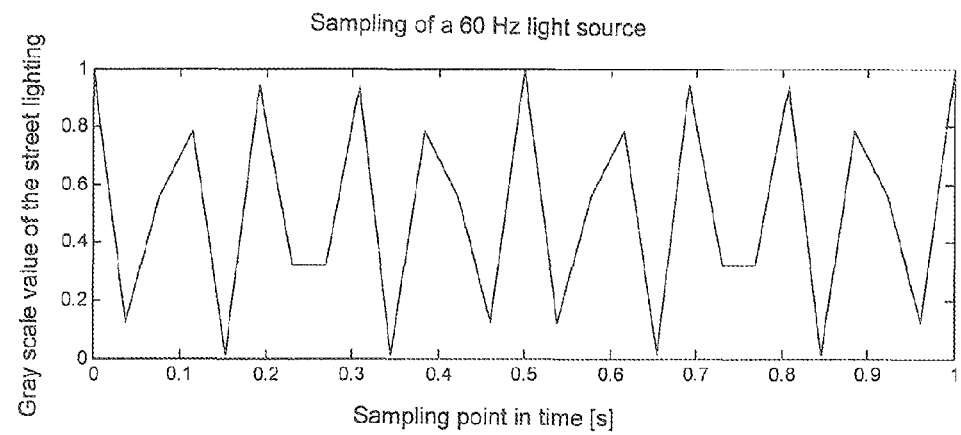
FIG. 18 is a diagram showing a brightness curve which is determined by sampling the brightness variations of the lamp operated at an alternating voltage of 60 Hz at another more unfavorable sampling rate.

In FIG. 18, the resulting brightness curve given the sampling of a light source operated at a 60 Hz alternating voltage at a sampling rate of 26 Hz is illustrated. The brightness curve illustrated in FIG. 18 differs from the brightness curve illustrated in FIG. 15 so that with the aid of this deviation it can be determined that the brightness curve illustrated in FIG. 18 is not a light source operated at a 50 Hz alternating voltage but a light source operated at 60 Hz.

In FIGS. 13 to 18, the brightness variations of a light source of a public street lighting are illustrated with the aid of a gray scale value which has been determined with the aid of one of the cameras 16, 18. However, any other light source can be recorded as an object, such as the light sources of traffic lights or illuminated traffic signs. But also the light sources for the illumination of buildings or rooms can be determined with the aid of the sampling such that it is determined that these light sources concerned are a light source supplied with an alternating voltage of 50 Hz or, respectively, of 60 Hz. Such a light source can be considered as being stationary. The actual speed between this camera and this light source is then the actual speed of the stereo camera in space, in particular the speed of a vehicle to which the camera is firmly connected. With the aid of this actual speed of the stereo camera, an actual change in distance within a time interval can easily be determined. Given an irregular movement of the stereo camera, the average of the speed during the period of time is determined. Preferably, the speed is integrated over the period of time.

The methods described in connection with FIGS. 1 to 18 are generally advantageously usable in stereo cameras 12. In contrast to the stereo camera 12 shown in FIG. 1, the stereo cameras can be stationary, with the object to be determined preferably having a relative movement with respect to the stereo camera. The stereo camera can, however, also be arranged in other moving objects, such as rail vehicles, air vehicles and sea vehicles. Further, the stereo camera 12 and the further elements 14 to 24 can be advantageously used in other motor vehicles, preferably trucks or buses. In addition, the images recorded with the aid of the cameras 16, 18 can also be displayed on display units in the respective vehicle or outside the vehicle as well as be transferred with the aid of a communication network.

In the superposition of the 100 Hz and 120 Hz brightness variations according to FIGS. 12, 13, 15 and 16 with the sampling rate of 22 Hz, there thus results the substantially corresponding curve of the resulting brightness at 100 Hz and 120 Hz since by means of the sampling, there results a 10 Hz oscillation each time according to the equations:

100 Hz−5*22 Hz=−10 Hz

120 Hz−5*22 Hz=10 Hz

The resulting 10 Hz oscillation is superposed by a harmonic oscillation according to the following equation:

100 Hz−4*22 Hz=12 Hz

120 Hz−6*22 Hz=−12 Hz

Thus, all sampling rates result in the same brightness curve when sampling the 100 Hz and the 120 Hz oscillation, for which the equation:

fundamental frequency of the brightness−$n$*sampling rate results in the same amount.

The procedures described are preferably controlled with the aid of a data processing equipment, in particular with the aid of a digital signal processor (DSP), which executes a specific computer program, as a result whereof at least part of the method steps described is executed.

Although in the drawings and in the previous description preferred embodiments have been illustrated and described in every detail, this is to be considered as being merely exemplary and as not restricting the invention. It is pointed out that only the preferred embodiments have been illustrated and described and all variations and modifications which are within the scope of the invention at present or in the future are protected. Instead of a stereo camera 12 comprising two single-image cameras 16, 18, for example a stereo camera having more than two single-image cameras can be used.

What is claimed is:

1. A method for determining a calibration parameter for a stereo camera, in which a relative movement of the stereo camera with respect to a further object is analysed, said method comprising the steps of:
   with the aid of object images of an object recorded at least two times one after the other at an interval by the stereo camera, the distance between the stereo camera and the object is each time determined,
   with the aid of the determined distances an apparent speed between the stereo camera and the object is determined,
   an actual speed between the stereo camera and the object is determined, and wherein, dependent on a deviation of the apparent speed from the actual speed, at least one calibration parameter for the determination of further distances between at least one of the stereo camera and the object and the stereo camera and further objects is determined with the aid of object images recorded by the stereo camera, and
   wherein the relationship between distance and speed is taken into account in the determination of at least one of the apparent and the actual speed.

2. The method according to claim 1, wherein an actual speed is determined by integration of the relative speed between the stereo camera and the object over the time interval between the recording of the object images.

3. The method according to claim 1, wherein an angle ($\gamma$) of optical axes of the single-image cameras of the stereo camera with respect to one another is determined as a calibration parameter, the angle ($\gamma$) preferably being determined at a pitch angle of 0° and a roll angle of 0°.

4. The method according to claim 3, wherein the angle ($\gamma$) serving as a calibration parameter is determined after an adaptation of the images recorded with the aid of this single-image camera which adaptation is performed dependent on the roll and pitch angles of the single-image camera which have actually been determined, the corrected images corresponding to images that would have been recorded with the aid of single-image cameras having roll and pitch angles of respectively 0°.

5. The method according to claim 3, wherein the determined angle ($\gamma$) is the yaw angle or the yaw angle deviation with respect to a preset yaw angle, which yaw angle or yaw angle deviation is calculated with the aid of at least one equation derived from the projective geometry, the determined angle ($\gamma$) being stored in an evaluation unit as an angle for evaluation and/or analysis of images recorded with the aid of single-image cameras.

6. The method according to claim 1, further comprising the step of determining a pitch angle ($\beta$) of the stereo camera, the determined pitch angle ($\beta$) being taken into account when determining the calibration parameter.

7. The method according to claim 1, further comprising the steps of determining a roll angle ($\alpha$) of the stereo camera, the determined roll angle ($\alpha$) being taken into account when determining the calibration parameter.

8. The method according to claim 1, wherein for determining a distance measurement, one image each is simultaneously recorded with one of each single-image camera of the stereo camera, or an image pair recorded with the aid of two single-image cameras.

9. The method according to claim 1, wherein at least one object property of an object to be assigned to the determined image correspondence is determined, and in that the actual speed or the actual change in position is determined with the aid of this object property.

10. The method according to claim 9, wherein an object property "light source" is operated with an alternating voltage, as a result whereof the object is considered to be stationary.

11. The method according to claim 9, characterized in that at least one object property of the object is transmitted to the stereo camera system preferably with the aid of a data network or a communication network, in particular the position of the object in space, the distance between the object and the stereo camera or between object and an evaluation unit being transmitted.

12. The method according to claim 1, wherein the position of the object is traced over several images taken one after the other and the apparent speed and/or the apparent distance of the object is repeatedly determined, preferably with the aid of a tracking method.

13. The method according to claim 1, wherein several images recorded one after the other are analysed with the aid of an object tracking method, the apparent movement of an object in space being determined, and one of an apparent speed vector and a apparent speed or the apparent direction of motion of the object being determined.

14. The method according to claim 1, wherein with the aid of the actual speed of the object in space and the time between the recording of the first and the second images an actual change in distance of the object in space is determined, and in that the deviation of the actual change in distance from the apparent change in distance determined with the aid of the distance measurements is determined, the calibration parameter being determined with the aid of this deviation.

15. The method according to claim 1, wherein the stereo camera system comprises at least a control unit and at least two single-image cameras.

16. The method according to claim 1, wherein at least one image correspondence is determined in first object images simultaneously recorded with the aid of the at least two single-image cameras of the stereo camera,
   wherein the image correspondence is assigned to an object, and
   wherein the image correspondence is determined at least in second object images simultaneously recorded with the aid of the single-image cameras of the stereo camera for finding the object.

17. The method according to claim 1, wherein at least one image correspondence is determined in first object images simultaneously recorded with the aid of the at least two single-image cameras of the stereo camera,
   wherein the image correspondence is assigned to an object, and
   wherein the image correspondence is determined at least in second object images simultaneously recorded with the aid of the single-image cameras of the stereo camera for finding the object.

18. The method according to claim 1, wherein the actual distance or the actual speed are acquired with the aid of a measured valued determined by a radar system.

19. A device for determining a calibration parameter for a stereo camera, in which a control unit analyses a relative movement between the stereo camera and a further object,
   the stereo camera records object images of the object at least two times one after the other at a time interval,
   the control unit each time determines the distance between the stereo camera and the object with the aid of the recorded object images,
   the control unit determines an apparent speed between the stereo camera and the object with the aid of the determined distances,
   the control unit determines the actual speed between the stereo camera and the object, and
   the control unit determines, dependent on the deviation of the apparent speed from the actual speed, at least one calibration parameter for the determination of further distances between the stereo camera and the object and/or between the stereo camera and further objects with the aid of object images recorded by the stereo camera,
   wherein the relationship between distance and speed is taken into account in the determination of at least one of the apparent and the actual speed.

20. A device for determining a calibration parameter for a stereo camera, in which a control unit analyses a relative movement between the stereo camera and a further object,
   the stereo camera records object images of the object at least two times one after the other at a time interval,
   the control unit each time determines the distance between the stereo camera and the object with the aid of the recorded object images,
   the control unit determines an apparent speed between the stereo camera and the object with the aid of the determined distances,
   the control unit determines the actual speed between the stereo camera and the object, and
   the control unit determines, dependent on the deviation of the apparent speed from the actual speed, at least one calibration parameter for the determination of further distances between the stereo camera and the object and/or between the stereo camera and further objects with the aid of object images recorded by the stereo camera, and
   wherein the relationship between distance and speed is taken into account in the determination of at least one of the apparent and the actual speed.

21. The device according to claim 20, wherein the actual distance or the actual speed are acquired with the aid of a measured valued determined by a radar system.

22. A device for determining a calibration parameter for a stereo camera, in which a control unit analyses a relative movement between the stereo camera and a further object,
   the stereo camera records object images of the object at least two times one after the other at a time interval,
   the control unit each time determines the distance between the stereo camera and the object with the aid of the recorded object images,
   the control unit determines an apparent change in distance between the stereo camera and the object with the aid of determined distances,
   the control unit determines the actual change in distance between the stereo camera and the object, and
   the control unit determines, dependent on the deviation of the apparent change in distance from the actual change in distance, at least one calibration parameter for the determination of further distances between the stereo camera and the object and/or between the stereo camera and at least one further object with the aid of object images recorded by the stereo camera.

* * * * *